(12) United States Patent
Lerosey et al.

(10) Patent No.: US 10,805,127 B2
(45) Date of Patent: Oct. 13, 2020

(54) WAVEFORM SHAPING DEVICE AND WAVE RECEIVER

(71) Applicants: GREENERWAVE, Nice (FR); CENTRE NATIONAL DE LA RECHERCHE SCIENTIFIQUE-CNRS, Paris (FR); ECOLE SUPÉRIEURE DE PHYSIQUE ET DE CHIMIE INDUSTRIELLES DE LA VILLE DE PARIS, Paris (FR)

(72) Inventors: Geoffroy Lerosey, Paris (FR); Mathias Fink, Meudon (FR); Philipp Del Hougne, Paris (FR); Timmy Floume, Paris (FR)

(73) Assignees: GREENERWAVE, Nice (FR); CENTRE NATIONAL DE LA RECHERCHE SCIENTIFIQUE—CNRS, Paris (FR); ECOLE SUPÉRIEURE DE PHYSIQUE ET DE CHIMIE INDUSTRIELLES DE LA VILLE DE PARIS, Paris (FR)

( * ) Notice: Subject to any disclaimer, the term of this patent is extended or adjusted under 35 U.S.C. 154(b) by 0 days.

(21) Appl. No.: 16/614,612

(22) PCT Filed: May 22, 2018

(86) PCT No.: PCT/EP2018/063311
§ 371 (c)(1),
(2) Date: Nov. 18, 2019

(87) PCT Pub. No.: WO2018/215415
PCT Pub. Date: Nov. 29, 2018

(65) Prior Publication Data
US 2020/0186398 A1 Jun. 11, 2020

(30) Foreign Application Priority Data

May 22, 2017 (FR) ..................... 17 54513

(51) Int. Cl.
*H04B 1/04* (2006.01)
*H04L 25/03* (2006.01)
*H04B 1/10* (2006.01)

(52) U.S. Cl.
CPC ..... *H04L 25/03828* (2013.01); *H04B 1/0475* (2013.01); *H04B 1/1027* (2013.01); *H04B 1/1081* (2013.01)

(58) Field of Classification Search
CPC ............ H01Q 5/50; H01Q 9/065; H01Q 9/40; H01Q 15/002; H01Q 15/0066;
(Continued)

(56) References Cited

U.S. PATENT DOCUMENTS 5,592,185 A * 1/1997 Itabashi ............... H01Q 3/2682
343/767
6,538,621 B1 3/2003 Sievenpiper et al.
(Continued)

FOREIGN PATENT DOCUMENTS

FR 3010836 A1 3/2015
WO 2015/039769 A1 3/2015

OTHER PUBLICATIONS

FR Search Report, dated Dec. 18, 2017, from corresponding FR application No. 1754513.
(Continued)

*Primary Examiner* — Rahel Guarino
(74) *Attorney, Agent, or Firm* — Nixon & Vanderhye

(57) ABSTRACT

A waveform shaping device that includes an adaptable surface, a controller, and a receiving device which measures a secondary wave following the reception of a primary wave by a receiver, the primary wave having been transmitted by (Continued)

a transmitter. Based on the measurement of the secondary wave, the controller determines an estimated value for optimization of the adaptable surface, without any connection to the receiver.

23 Claims, 3 Drawing Sheets

(58) Field of Classification Search
CPC ...... H01Q 21/065; H01Q 13/02; H01Q 19/10; H01Q 19/108; H01Q 3/44; H04L 125/03828; H04B 1/0475; H04B 1/1027; H04B 1/1081; H02J 50/20
See application file for complete search history.

(56) References Cited

U.S. PATENT DOCUMENTS

| | | |
|---|---|---|
| 2004/0263408 A1 | 12/2004 | Sievenpiper et al. |
| 2016/0233971 A1 | 8/2016 | Fink et al. |

OTHER PUBLICATIONS

International Search Report, dated Jul. 19, 2018, from corresponding PCT application No. PCT/EP2018/063311.

* cited by examiner

WAVEFORM SHAPING DEVICE AND WAVE RECEIVER

TECHNICAL FIELD

The present invention relates to a wave shaping device.

PRIOR ART

More particularly, the invention relates to a wave shaping device for optimizing the reception of a primary wave at a receiver, said wave shaping device comprising:
- a surface which interacts with the primary wave, said surface comprising a plurality of adjustable elements for modifying an impedance of said surface and for modifying the manner in which the primary wave is reflected and/or transmitted by said surface, and
- a controller connected to the surface, said controller comprising an optimization module which maximizes or minimizes a value for determining parameters, and said controller controls the adjustable elements based on said parameters.

Document WO 2015/039769 shows the use of a wave shaping device of this type which retrieves, by a transmission device, a pilot wave emitted by a mobile electronic device (receiver). The mobile electronic device is for example a mobile phone or a laptop computer. This pilot wave includes, for example, the level or quality of reception of an incident wave on the mobile electronic device.

This shaping device therefore has a wireless connection with the mobile electronic device, which is sometimes impractical or very restrictive, particularly for the mobile electronic device which must manage two wireless communications: the wireless communication with the network and the wireless communication with the shaping device.

In addition, the wave shaping device receives the information contained in the pilot wave at a periodicity controlled by the mobile electronic device. This periodicity is sometimes insufficient for a sufficiently rapid adaptation of the electromagnetic surface.

SUMMARY OF THE INVENTION

One object of the present invention is to provide an improvement to the wave shaping device, wherein the wave shaping device does not need this wireless link with the mobile electronic device (the receiver of the primary wave).

For this purpose, the wave shaping device of the aforementioned type is characterized in that:
- it further comprises a wave receiving device which is connected to the controller and which measures a secondary wave generated by the reception of the primary wave by a receiver, without the receiver transmitting information to the wave shaping device concerning its reception of the primary wave, and
- the controller comprises an estimation module which determines an estimated value for the reception of the primary wave by the receiver, by means of the measurement of the secondary wave, and the optimization module of the controller uses said estimated value to determine the control parameters of the adjustable elements.

With these arrangements, the wave shaping device deduces a value (intensity, level, quality, etc.) concerning the reception by the receiver by measuring a signal generated implicitly by the receiving antenna of this receiver during reception of the primary wave by this receiver.

The shaping device thus does not need to be connected with the receiver since it deduces this value without a feedback pilot signal explicitly containing it. The secondary wave thus constitutes a virtual feedback signal without collaboration with the receiver: i.e. without the voluntary intervention of the receiver.

The shaping device thus operates faster, in other words in finding parameters that improve the reception of the primary wave by the receiver.

The shaping device is thus more efficient, meaning that optimal parameters lead to a better improvement of the reception of the primary wave by the receiver.

Finally, the receiver consumes less internal energy and receives more via the primary wave, which is very advantageous for an autonomous device.

In various embodiments of the wave shaping device according to the invention, one or more of the following arrangements may also be used.

According to one aspect, the wave shaping device further comprises a transmission device connected to the controller and connected to the transmitter of the primary wave by a network link in order to know a time instant at which the transmitter emits the primary wave, and the estimation module uses said time instant to determine the estimated value for said receiver.

According to one aspect, the estimation module performs a recognition of the receiver by comparing a processing of the measurement of the secondary wave with a predetermined signature corresponding to said receiver, and then deduces the estimated value.

According to one aspect, the comparison is a calculation of the correlation or inter-correlation between the processing of the measurement of the secondary wave and the predetermined signature.

According to one aspect, the processing comprises an extraction of a time signal, for example by filtering.

According to one aspect, the primary wave has a main frequency, and the processing comprises an extraction of at least one signature frequency different from said main frequency.

According to one aspect, the signature frequency is an integer harmonic higher or lower than the main frequency.

According to one aspect, the processing comprises a heterodyne detection which lowers the frequencies of the measurement of the secondary wave.

According to one aspect, the processing comprises a decoding of a numeric code included in the measurement of the secondary wave.

According to one aspect, the wave receiving device comprises a multi-antenna for spatially selecting a region including the receiver.

According to one aspect, the wave receiving device focuses on the receiver by beamforming.

According to one aspect, the wave shaping device is such that:
- the receiver is a module for recovering energy from the primary wave, and
- the estimated value corresponds to an estimate of the intensity of the primary wave received by the receiver.

According to one aspect, the wave shaping device is such that:
- the receiver is a wireless communication device,
- the transmitter is an access point of a wireless communication network, which emits a primary wave corresponding to a communication with the wireless communication device.

According to one aspect, the estimation module spies on the communication by measuring the primary wave and extracts data to determine the estimated value.

According to one aspect, the measurement of the primary wave in order to spy on the communication is performed by the wave receiving device which measures the secondary wave.

According to one aspect, the time instant is the time at which the access point establishes said communication with the wireless communication device.

According to one aspect, the estimation module receives, from the access point and via the network link connected to the transmission device, the communication between said access point and the receiver, and extracts data therefrom in order to determine the estimated value.

According to one aspect, the surface is integrated into an element selected from a list comprising:
  building construction elements, such as a concrete block, a brick, insulation, an insulating board, a plasterboard, and
  building trim elements, such as parquet flooring, carpet flooring, tile flooring, paneling, an attached partition, a ceiling, a false ceiling panel, and
  furnishing elements, such as a desk, a cabinet, a unit with shelving, shelves, a mirror, a decorative picture, a light fixture.

The invention also relates to a wave receiver adapted for use with a wave shaping device as presented above, said wave receiver comprising:
  an antenna adapted to receive a primary wave coming from a transmitter, and
  a processing unit connected to said antenna in order to process the signals from the antenna, said receiver being characterized in that it further comprises a signature element adapted to emit a secondary wave which is a function of the primary wave received by said antenna.

In various embodiments of the wave receiver according to the invention, use may optionally also be made of one or more of the following.

According to one aspect, the signature element is connected to the antenna in order to cause it to emit the secondary wave.

According to one aspect, the signature element is a passive element.

According to one aspect, the signature element is a non-linear electrical circuit which deforms the signal of the primary wave with a predetermined signature in order to generate the secondary wave signal.

According to one aspect, the primary wave has a main frequency, and wherein the predetermined signature is at least one signature frequency different from said main frequency.

According to one aspect, the signature frequency is an integer harmonic higher or lower than the main frequency.

BRIEF DESCRIPTION OF THE DRAWINGS

Other features and advantages of the invention will become apparent from the following description of one of its embodiments, given as a non-limiting example, with reference to the accompanying drawings.

In the drawings.

In the different figures, the same reference numbers designate identical or similar elements.

DETAILED DESCRIPTION OF EMBODIMENTS

The invention relates to a wave shaping device. The wave is a main wave or primary wave which can be electromagnetic, acoustic, or vibrational in nature.

For simplicity, the invention will be described mainly in the context of an electromagnetic wave application, in particular for the use of wireless transmissions of various types:
  transmission of electromagnetic energy, or
  mobile telephony of type GSM, 3G, 4G, 5G, or
  wireless network of type WiFi, Bluetooth, or
  network between connected objects, for example of type iOT, or
  badge readers of type RFID, or
  any other application between devices having a wireless connection by radio wave.

However, the invention applies to any frequency domain of the waves.

Figure 1:
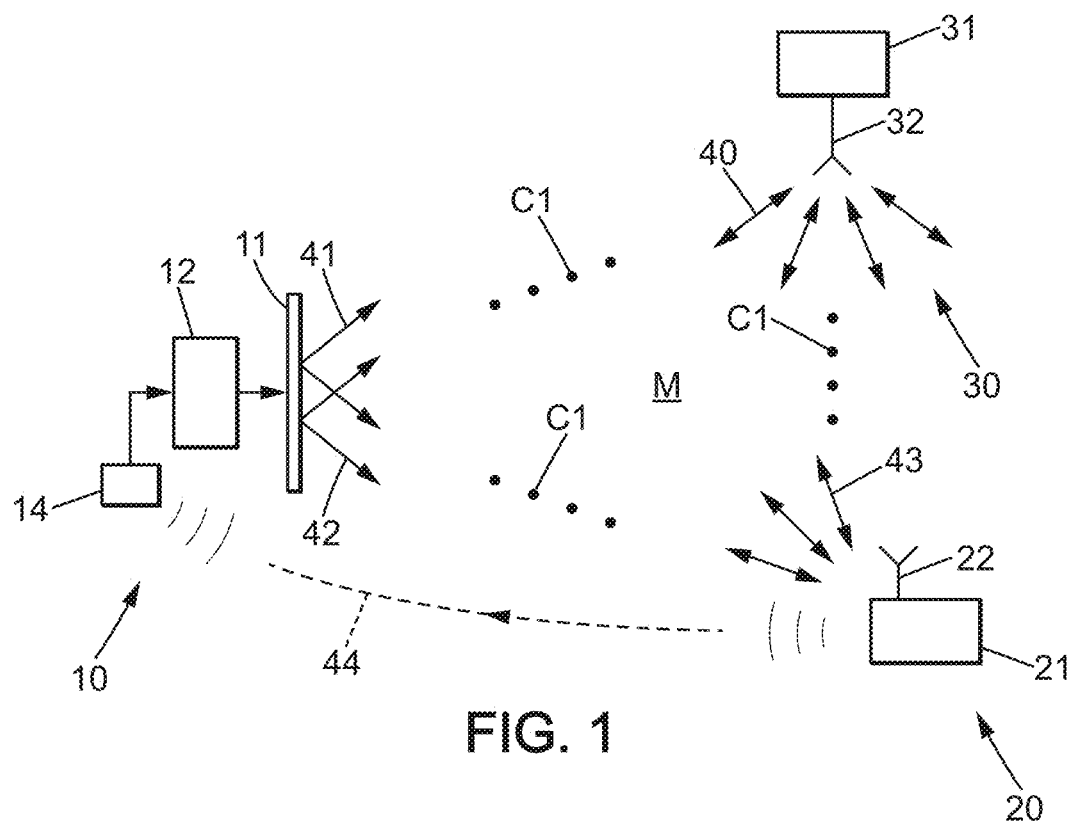
FIG. 1 is a general schematic view of a first embodiment of a wave shaping device according to the invention.

FIG. 1 shows a schematic view showing a general use of a wave shaping device 10 according to a first embodiment of the invention, which improves the reception of a primary wave by a receiver 20.

The system as a whole comprises:
  a first device called a transmitter 30, adapted to at least emit a primary wave 40 in a wave propagation medium M, and possibly reciprocally receive a primary wave in this medium,
  a second device called the receiver 20, adapted to at least receive a transmitted primary wave 43 in this medium, said transmitted primary wave being transmitted directly or by reflections and/or transmissions, and/or a multiple combination of said transmissions and/or reflections, and
  a wave shaping device 10 adapted to improve, at the receiver 20, the reception of the primary wave 40 emitted by the transmitter 30 and received as a transmitted primary wave 43.

The transmitter 30 is a wireless emission device which comprises:
  an antenna array 32 which emits the primary wave 40 which propagates in the medium M, said antenna array 32 possibly being able to reciprocally receive a primary wave 40, and
  a communication unit 31 which controls said antenna array 32.

The receiver 20 is a wireless receiving device which comprises:
  an antenna 22 (or receiving device) which receives a transmitted primary wave 43 which has propagated in the medium M, said antenna 22 possibly being able to reciprocally emit a wave in the medium, and
  a processing unit 21 connected to said antenna 22 in order to process the signals coming from the antenna 22 and intended for the antenna 22.

The receiver 20 is optionally a mobile device or a device able to be moved from one location to another. It is powered by an electrical outlet or an internal battery. The receiver 20 may not be mobile, and its position can be determined by various factors able to take into account the reception quality of the primary waves coming from the transmitter 30.

The receiver 20 thus receives the primary wave coming from the antenna array 32 of the transmitter 30 directly and/or indirectly by reflecting on elements of the medium (the environment), in the form of a transmitted primary wave 43 which is the combination of the contributions of all these direct or indirect paths.

The wave shaping device 10 comprises:
- an adaptable (electromagnetic) surface 11 which reflects an incident primary radio wave 41 as a reflected wave 42, said waves propagating in the same medium, and
- a controller 12 connected to the adaptable (electromagnetic) surface 11 in order to control said adaptable surface 11, in particular to vary an impedance (electromagnetic), which modifies the manner in which the incident wave 41 is reflected as a reflected wave 42.

The wave shaping device 10 is advantageously located in a medium presenting reception difficulties for one or more wireless receivers. The purpose of the wave shaping device is therefore to improve the reception of the receiver 20 in an area encompassing this receiver 20 and the wave shaping device 10. This wave shaping device 10 is for example useful in an environment having numerous and/or complex reflections for the waves, said reflections interfering with the reception of the receiver 20. The wave shaping device 10 generates another reflection which is controlled to improve the reception of the receiver 20.

The wave shaping device 10 is thus within the range of the receiver 20 and transmitter 30, i.e. at a distance to allow reception of a non-zero incident wave 41, and at a distance from the receiver 20 to allow reception of a non-zero transmitted wave contribution 43. This depends on the distances, but also on the propagation medium as explained above (multiple reflections).

The wave shaping device 10 reflects the incident wave 41 emitted by the transmitter 30 or reflected by another wave shaping device, as a reflected wave 42. In a very simplified manner, the reflected wave 42 then also propagates in the medium, for example towards the receiver 20 where it contributes to the transmitted primary radio wave 43 received by said receiver 20.

The adaptable (electromagnetic) surface 11 can be constructed in numerous ways.

U.S. Pat. No. 6,538,621 shows an example of an electromagnetic surface whose impedance is adaptable or modifiable. This electromagnetic surface 11 comprises a plurality of resonator elements, each resonator element being adjustable. The electromagnetic surface 11 of that document comprises plate elements located at a distance from a ground plane, the neighboring plate elements being connected to each other by a variable capacitor, each variable capacitor being able to be controlled by a control potential. The impedance of the electromagnetic surface is thus modified, for example to focus the reflected wave 42 or to give a spatial direction to the reflected wave 42. Optionally, the electromagnetic surface 11 consists of a plurality of cells, each cell comprising two different resonator elements.

Patent No. WO 2015/039769 cites and shows other types of resonator elements that can be used in an electromagnetic surface with adaptable impedance:

- a variable diode can replace the variable capacitor,
- the resonator elements can be of a single polarization type or of two polarization types, possibly distributed in an alternating manner on the surface,
- the resonator elements have one or more resonance frequencies for controlling a predetermined frequency band,
- the resonator elements are binary elements with two states, for example defined by a change of phase or of amplitude of the modified wave.

Many variants of known resonator elements can be used to form an electromagnetic surface 11 with adaptable impedance.

The controller 12 of the wave shaping device 10 controls for example all the adjustable elements (variable capacitor or diode for example) of the electromagnetic surface 11 which allow modifying its impedance. This modification is much more complex than spatial directivity or focusing. It modifies the spatial distribution of the radio wave of the first communication channel C1 in an area around the wave shaping device 10 out to the receiver 20.

In patent application WO 2015/039769, the shaping device 10 comprises a transmission device for connecting to the receiver 20 (mobile electronic device) and collecting information contained in a pilot wave coming from this transmission device of this receiver 20, this information possibly being the level or the quality of the communication between the transmitter (the network station or access point) and the receiver (mobile electronic device).

The inventors have found that they could do without such a connection between the receiver 20 and the wave shaping device 10: the simple reception by the antenna 22 of the modified transmitted radio wave 43 (coming from a reflected wave 42) itself immediately emits a secondary wave 44 which is a reflection of the transmitted radio wave 43. This secondary wave 44 has physical characteristics which are functions of the reception of the transmitted radio wave 43 received by the antenna 22 of the receiver 20, in other words the radio reception between the antenna array 32 and the antenna 22 of the receiver 20.

Said physical characteristics are a sort of signature of this reception, and it is possible to estimate quantities which are for example:
- an estimate of the level (amplitude, power, intensity) of the reception of the transmitted radio wave 43 received by the receiver 20 through the medium between the transmitter 30 and the receiver 20, with the contribution of the reflected wave 42 coming from the wave shaping device 10, or
- an estimate of the quality (level of interference, bandwidth, bit rate) of the reception of the transmitted radio wave 43 received by the receiver 20.

The wave shaping device 10 according to the invention is therefore improved because:
- it further comprises a wave receiving device 14 which is connected to the controller 12, and which is adapted to measure the secondary wave 44 produced by the reception of the primary wave transmitted between the transmitter 30 and the receiver 20, and
- the controller 12 comprises an estimation module 12c which determines an estimated value for the reception of the primary wave by the receiver, by means of the measurement of the secondary wave, and the optimization module 12b of the controller uses said estimated value to determine the control parameters of the adjustable elements.

The receiver 20 has no connection with the wave shaping device 10, and vice versa. The receiver 20 does not transmit information to the wave shaping device 10 concerning the reception of the transmitted radio wave 43, i.e. the reception of the wave coming from the transmitter 30.

Figure 2:
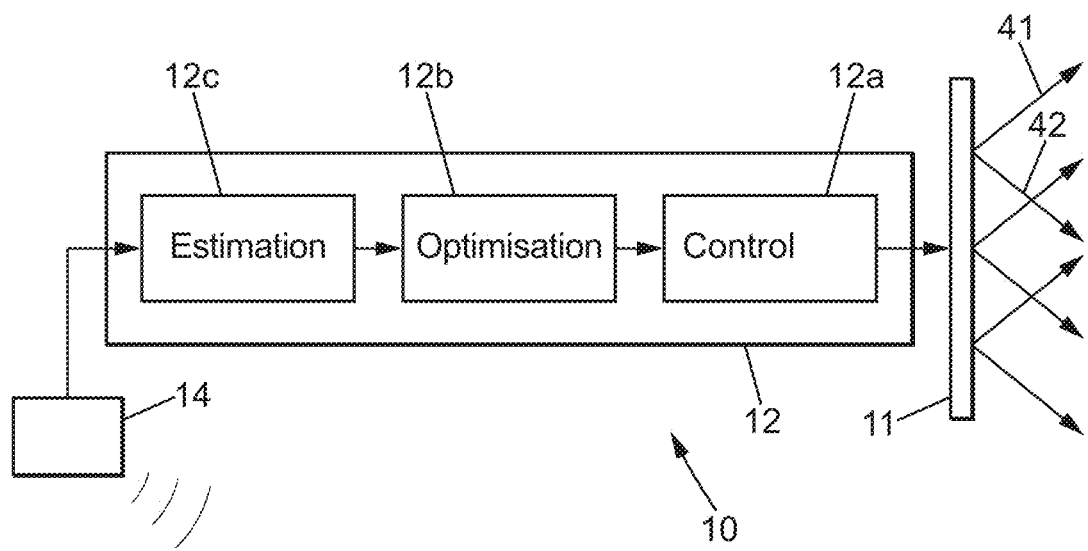
FIG. 2 is a detailed view of the wave shaping device of FIG. 1.

The controller 12 therefore indirectly determines an estimated value for this reception (transmitted radio wave 43) solely using the measurement of the secondary wave 44, for example by means of an estimation module 12c as represented in FIG. 2.

The secondary wave 44 thus makes it possible to produce a sort of feedback loop without the intervention of the receiver 20, i.e. without its collaboration in the operation of this feedback loop. The inventors have found that this measurement of the secondary wave 44 is a sufficient signal for the controller 12 to perform the following steps: optimize and determine parameters, then control the adaptable (electromagnetic) surface 11 with these parameters.

The controller 12 thus comprises:
- an estimation module 12c which uses the measurement of the secondary wave 44 to estimate or calculate an estimated value corresponding to the reception by the receiver 20 (level estimate or quality estimate),
- an optimization module 12b which receives the value estimated by the estimation module 12c and which determines control parameters for the adaptable (electromagnetic) surface 11, and
- a control module 12a connected to the adaptable (electromagnetic) surface 11, said control module 12a applying the control parameters to the adaptable (electromagnetic) surface 11 to modify its impedance.

The estimation module 12c can be implemented in various ways.

For example, the estimation module 12c performs frequency filtering to determine the estimated value. The antenna 22 of the receiver 20 optionally has a non-linear element which transforms the transmitted radio wave 43 and which emits a secondary wave 44 which comprises predetermined frequency components, for example harmonic frequencies of a base frequency of the primary wave 40. The estimation module 12c filters these frequency components to extract characteristics (amplitude, phase) of one or more of these harmonic frequencies and to deduce the estimated value.

Optionally, the estimation module 12c also implements a recognition method that makes it possible to identify that the measurement of the secondary wave 44 does indeed correspond to a transmission between the transmitter 30 and the receiver 20.

The recognition method performs, for example, a comparison of a processing of the measurement of the secondary wave with a predetermined signature corresponding to the receiver 20 (physical characteristic of the receiver 20), said predetermined signature being for example prerecorded in memory.

The processing comprises for example an extraction of a time signal from the measurement of the secondary wave.

The processing comprises for example an extraction of one or more signature frequencies from the measurement of the secondary wave.

The primary wave has for example a main frequency $f_0$ (typically a carrier wave frequency of a transmission wave), and the signature frequency is a frequency different from said main frequency, in order to characterize and recognize the secondary wave of the receiver 20.

Advantageously, the signature frequency is an integer harmonic (for example $2 \cdot f_0$ or $3 \cdot f_0$) above the main frequency $f_0$, or an integer harmonic (for example $f_0/2$ or $f_0/3$) below the main frequency $f_0$.

The processing comprises for example a heterodyne detector which makes it possible to lower the frequencies of the signals.

The processing optionally comprises frequency demodulation.

The processing comprises for example a decoding of a numeric code included in the measurement of the secondary wave.

The processing thus possibly comprises one or more processes among: frequency filtering, time decoding, envelope detection, calculating an average, calculating a maximum, and their equivalents.

The processing and the comparison with the predetermined signature make it possible to deduce the estimated value representative of the intensity of the transmitted wave 43 received by the receiver 20, and then to carry out the optimization described below.

The predetermined signature is an intrinsic physical characteristic of the antenna 22 of the receiver 20 or a physical characteristic added to the antenna 22 or connected to the antenna 22 for recognizing the receiver 20, for example among a plurality of receivers.

The comparison can be implemented in various ways including a correlation calculation or an inter-correlation calculation, either directly from the measurement of the secondary wave or indirectly after processing as mentioned above, or a simple numeric comparison in the case of decoding a numeric code.

This predetermined signature is for example non-linear, generated by the non-linear element which transforms the transmitted radio wave 43 and which emits a secondary wave 44.

This predetermined signature is for example one or more resonance frequencies of excited resonances of the antenna 22 or of an added element.

The optimization module 12b executes an optimization algorithm based on the preceding set of parameters (temporally), the preceding estimated values, and the current estimated value determined by the estimation module 12c.

The optimization algorithm may be a maximization of the estimated value or a minimization of the estimated value, depending on the amount represented by said value. In several successive steps, the optimization algorithm makes it possible to obtain an optimal set of parameters.

This optimal set of parameters is different from the one which would be obtained if the receiver 20 transmitted information about the reception (level, quality). It gives an optimization that is less advanced but sufficient for obtaining a true improvement in the reception.

On the other hand, the optimization can be carried out more quickly, because the receiver 20 does not need to transmit this information via any connection, and because the secondary wave 44 is directly and physically linked to the transmitted radio wave 43 received by the receiver 20: the wave shaping device 10 can then estimate the estimated value at a periodicity greater than that of a receiver 20 which allocates few resources to this function, a function which is only an informational function with a low periodicity or refresh rate, while the wave shaping device 10 uses it in an optimization process which must be fast and precise.

In addition, as the receiver 20 does not transmit information via a connection, it consumes less energy, which is important because the receiver 20 is most often a mobile device powered by a battery, or a device powered by the recovery of energy from the primary wave. This energy advantage is amplified by the optimization of the wave shaping device 10, which increases the level of reception at the receiver 20 (i.e. the energy level).

The control module 12a of the controller 12 then applies the set of parameters determined by the optimization module 12b and controls the adjustable resonator elements of the adaptable (electromagnetic) surface 11. This process determines a particular state of the adaptable (electromagnetic) surface 11 which modifies the incident radio wave 41 into a reflected radio wave 42.

The transmitted radio wave 43 received by the receiver 20 is a combination of this reflected wave 42 and the primary radio wave 40 coming from the antenna array 32.

Many known optimization algorithms can be used.

The receiving device 14 comprises for example a single receiving antenna.

According to a variant, the receiving device 14 comprises a plurality of antennas (at least two) and a processing unit that combines the signals of these antennas, for example in order to spatially select a spatial region, for example located around the receiver 20.

The processing unit of the receiving device 14 optionally performs beamforming and focuses the reception of the secondary wave 44 in a predetermined spatial area around the receiver 20.

Figure 3:
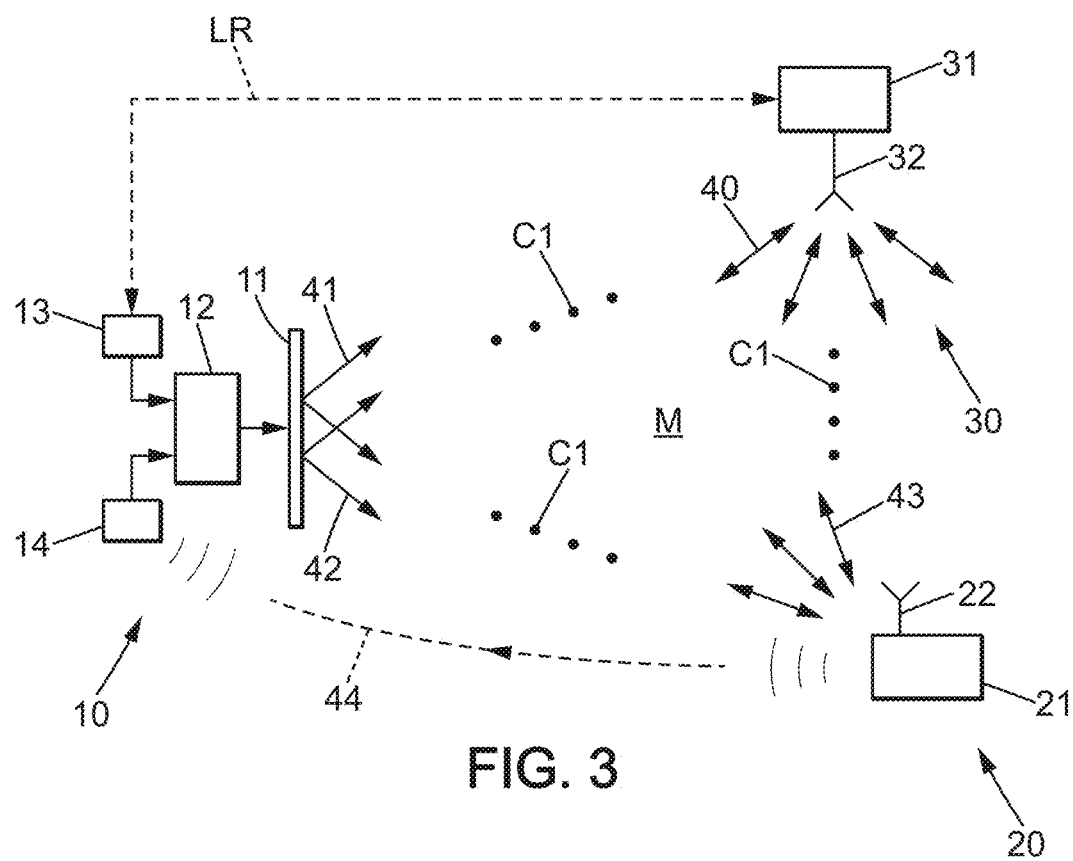
FIG. 3 is a general schematic view of a second embodiment of a wave shaping device according to the invention.

FIG. 3 shows a schematic view showing a general use of a wave shaping device 10 according to a second embodiment of the invention, which improves the reception of a primary wave by a receiver 20.

The system of this second embodiment is similar to that of the first embodiment, and its variants can also be applied with the same respective advantages.

This embodiment differs from the previous one in that the shaping device 10 further comprises a transmission device 13 connected to the controller 12, and it is connected to the transmitter 30 (which emits the primary wave 40) by a network link LR in order to know the time instant at which the transmitter 30 emits the primary wave 40.

Figure 4:
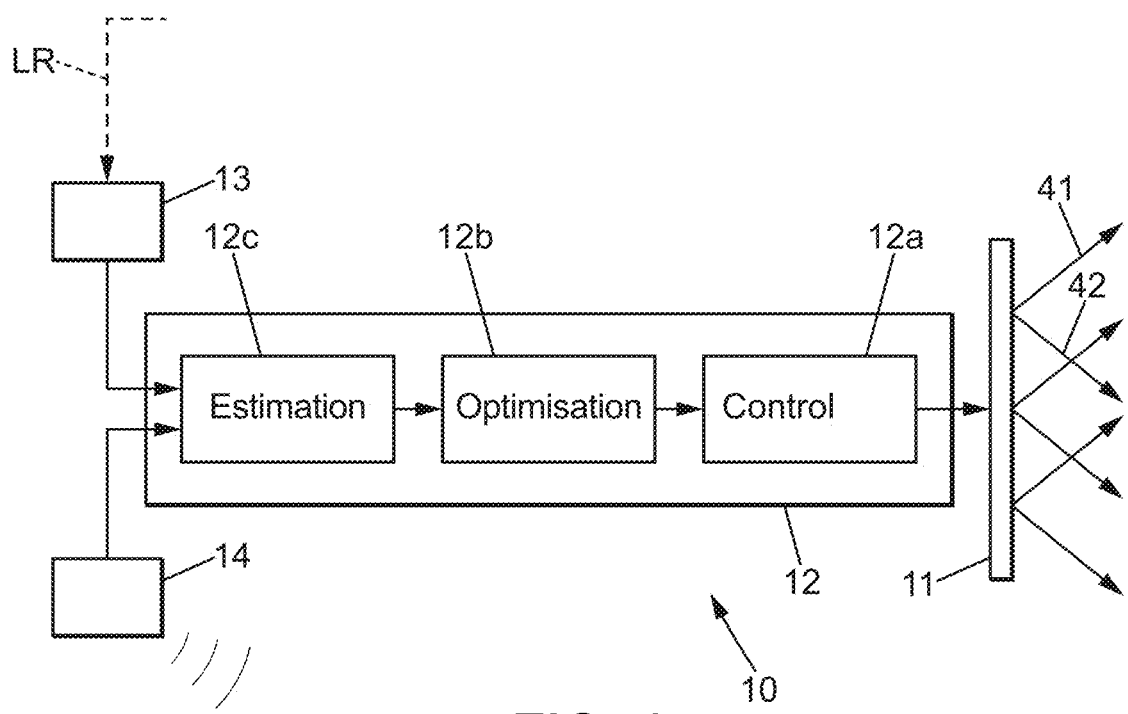
FIG. 4 is a detailed view of the wave shaping device of FIG. 3.

Furthermore, as represented in FIGS. 3 and 4, the estimation module 12c uses the measurement of the secondary wave and this time instant to extract the temporal portion of the measurement of the secondary wave 44 which is relevant for determining the estimated value concerning the reception by the receiver 20.

This temporal synchronization of the estimation module 12c with the transmitter makes it possible to improve the speed of convergence of the optimization and to improve the performance of the optimization. The reception of the primary wave at the receiver is thus increased (level) and improved (quality).

According to one variant, the transmitter 30 also transmits a code to the wave shaping device 10 at the same time as the time instant, and the estimation module 12c decodes the measurement signal of the secondary wave 44 and identifies said code in this secondary wave 44 in order to confirm that the measurement does indeed correspond to the reception by the receiver 20.

According to another variant, the transmitter 30 transmits additional information to the wave shaping device 10 such as time information or frequency information or numeric information (such as a code) about the transmission with the receiver 20, and the estimation module 12c does a comparison with the measurement signal of the secondary wave 44 and identifies the communication in this secondary wave 44.

The network link LR is a wired link (for example Ethernet) or a wireless connection by computer or telephone, using one of the protocols already mentioned.

As already mentioned at the beginning of this detailed description, the wave shaping device can be implemented in many applications.

According to a first application, in wireless transmission of energy (for example electromagnetic), the wave shaping device 10 according to the invention makes it possible to optimize the adjustment of the adaptable surface 11 with no connection with the receiver 20, this receiver 20 being a module for recovering energy from the transmitted primary wave 43 received by said receiver 20 or even from any wave of the environment or medium M received by the receiver 20. This application is for example very useful for using waves to power wireless sensors, or wirelessly connected autonomous objects (iOT for "Internet of things").

In this case, the estimation module 12c determines an estimated value which corresponds to an estimate of the intensity or energy of the transmitted primary wave 43 received by the receiver.

Then, the wave shaping device 10 improves the energy recovery of this receiver 20, wireless energy recovery module.

An energy recovery module is typically a non-linear device that captures a signal from an ambient wave and rectifies it to form DC voltage. These devices generally comprise diodes which are non-linear elements that generate a secondary wave re-emitted by their operation, this secondary wave being is captured by the receiving device 14 of the wave shaping device 10.

Many examples of such circuits exist.

The inventors have tested this application.

Figure 5:
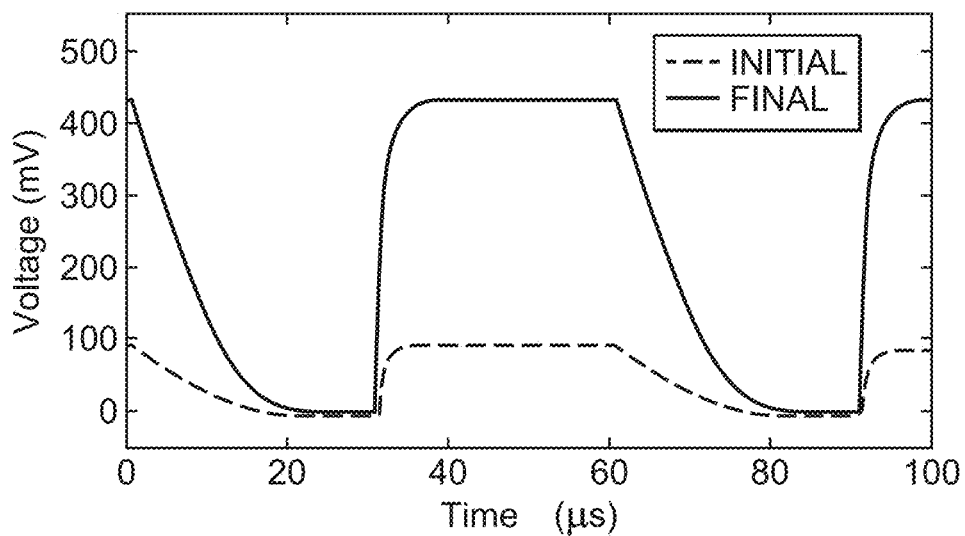
FIG. 5 is an example curve of the improvement in the reception of an energy recovery module due to a wave shaping device according to the invention.

FIG. 5 shows results obtained with a transmitter 30 which emits a primary wave 40 during cycles of a duration of 30 µs. The curve in this figure shows the evolution of the output voltage from the energy recovery module. The first dashed line corresponds to any configuration of the wave shaping device 10. The second dashed line corresponds to a configuration after optimization of the parameters of the adaptable surface 11 determined by the controller 12 after about 200 iterations, i.e. 200 primary wave emission cycles, which corresponds to an optimization time of only 12 ms.

Figure 6:
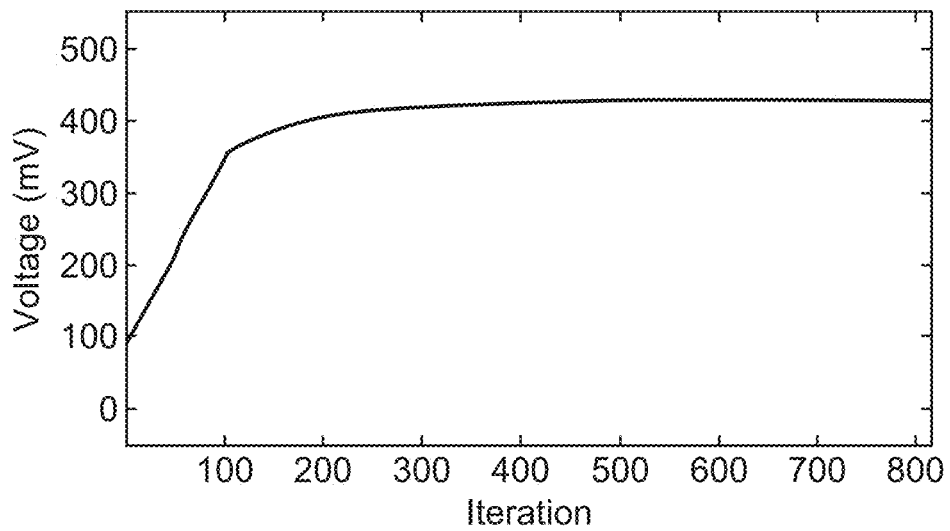
FIG. 6 is a curve showing the iterations of the optimization of the shaping device used for FIG. 5.

FIG. 6 shows the evolution of the output voltage of the energy recovery module (at its plateau during reception of the primary wave with a set of parameters of the adaptable surface) as a function of the number of iterations (i.e. cycles).

The wave shaping device 10 detects the secondary wave produced by the reception of the primary wave at the receiver, and with no connection thereto, and, iteration after iteration, optimizes the configuration of the adaptable surface 11 to increase an estimated value which is more or less a function of the intensity (level) received by the receiver 20. This indirect and non-voluntary feedback loop of the receiver 20 is quite sufficient in the present example for increasing the level of the voltage output from the energy recovery module by a factor of four, and this is done with a very small number of iterations, therefore very quickly. It is understood that the wave shaping device 10 makes it possible to obtain a better supply of power very quickly, which makes it possible to wake up an autonomous receiving device 20 more quickly and/or for this autonomous receiver 20 to perform more processing.

According to a second application, in wireless communication transmission (in wireless telephony or in wireless network), the wave shaping device 10 according to the invention makes it possible to optimize the adjustment of the adaptable surface 11 with no connection with the receiver 20, this receiver 20 being a wireless communication device such as a cell phone or a computer with a WiFi connection, or any other wireless receiver.

In this case, the estimation module 12c determines an estimated value which corresponds to an estimate of the reception level or reception quality of the transmitted primary wave 43 received by this receiver 20, i.e. the reception level or the reception quality of the wireless communication actually received.

The transmitter 30 is for example an access point or network station of a wireless communication network, which emits a primary wave 40 in the medium M, said primary wave 40 corresponding to a communication intended for a receiver 20 (wireless communication receiving device) in a communication channel C1.

According to a first variant, the estimation module 12c spies on the communication by measuring the primary wave 40 emitted by the transmitter (access point) 30, and decodes this measurement signal of the primary wave in order to extract data from said communication, and then selects data corresponding to information useful for determining the estimated value from the optimization process of the wave shaping device 10.

In fact, the wireless communication receiving devices themselves also estimate the level and quality of the communication they receive and send this information back to the transmitter (access point) 30. The transmitter (access point) reciprocally does the same process of exchanging data over the wireless communication. The wave shaping device 10 therefore spies on this communication without this information being requested or required from the receiver 20.

The measurement of the primary wave done by the wave shaping device 1a for such spying is:
either performed by a transmission device 13 of the wireless type, independently of the receiving device (14) which measures the secondary wave resulting from the communication with the receiver 20;
or is performed by the receiving device 14 itself, which then serves to measure the primary wave in order to perform this spying on the communication and which serves to measure the secondary wave.

The estimation module 12c then uses all the information it can extract from the communication and the image of the reception of this communication which is in the measurement of the secondary wave, in order to determine the estimated value from the optimization process of the shaping device 10 described herein.

According to a second variant, the wave shaping device 10 is advantageously connected to the transmitter (access point) 30 comprises a transmission device 13 which connects the controller 12 to the transmitter (access point) 30 of the primary wave by a network link LR as presented above in the second embodiment of the invention (FIGS. 3 and 4). This allows it to retrieve from the transmitter 30:
a communication identification code to identify the communication between the transmitter 30 and the receiver 20 among a plurality of receivers; and/or
information on the time instant at which the transmitter 30 emits the primary wave 40 to that particular receiver 20.

In this case, the time instant is the time at which the transmitter (access point) 30 establishes a communication with the receiver (wireless communication device) 20 in this communication channel C1.

Thus, the transmitter (access point) 30 transmits to the wave shaping device the time instant at which it establishes communication with the receiver (wireless communication device) 20 so that the wave shaping device 10 can measure a secondary wave and determine an estimated value for the reception of said communication (level, quality).

Optionally, the transmitter (access point) 30 also transmits to the wave shaping device 10 additional information for recognizing and/identifying said communication, as described above (frequencies, channel, communication identification code).

The two above variants can be combined: the wave shaping device 10 spies on the communication and receives information from the transmitter 30.

According to a third application, the wave shaping device 10 according to the invention allows is used simultaneously and/or almost simultaneously for the two previously presented applications:
improving the transmission of wireless energy between a wireless energy transmitter and the receiver 20, and
improving a wireless communication by wave between a wireless communication transmitter and the receiver 20.

The receiver 20 thus comprises:
one or more antennas 22,
a module for recovering energy from the transmitted primary wave 43 received by the receiver, and
a communication module 43 for the transmitted primary wave received/emitted by the receiver.

Thus, the wave shaping device 10 optimizes the adjustment of the adaptable surface 11 without any connection with the receiver 20, only with the secondary waves generated autonomously upon receiving the transmitted primary wave 43 received by the receiver 20.

Alternatively, the receiver 20 receives a first primary wave for its energy recovery module, and a second primary wave for its communication module. The first primary wave and second primary wave are possibly different in type, and they are possibly generated in the medium by different specialized transmitters.

Thus, the wave shaping device 10 optimizes the adjustment of the adaptable surface 11 with no connection with the receiver 20, only with the first and second secondary waves. The adaptable surface 11 comprises, for example, adaptable elements adapted to each of said first and second primary waves.

In a variant, there are two wave shaping devices, 10, 10', a first for optimizing the reception of the first primary wave, and a second for optimizing the second primary wave, these two wave shaping devices 10, 10' being able to be interconnected by any means in order to improve and synchronize their respective optimizations.

These wave shaping devices 10 are therefore very useful for supplying power via waves and for improving the wireless communications of wireless sensors or of autonomous objects connected wirelessly (iOT for Internet of things), these objects having a need for autonomy and for communication of measured data.

According to a fourth application, in badge detection, for example an identification badge, for example using RFID or any other badge identification technology, the wave shaping device 10 of the invention allows optimizing the adjustment of the adaptable surface 11 without connecting with the receiver 20, this receiver being said badge.

In this case, the estimation module 12c determines an estimated value which corresponds to an estimate of the intensity or reception level of the primary wave 43 transmitted by the receiver 20.

The wave shaping device 10 improves the reception of this primary wave 43 transmitted by the receiver 20 (the badge).

The receiver 20 (badge) then generates a secondary wave in response to the reception of the transmitted primary wave 43. In such a case, this secondary wave comprises a numerical identification code of the badge. The secondary wave is then captured by the receiving device 14 of the wave shaping device 10.

The transmitter 30 is part of a system that seeks to identify badges. It emits the primary wave 40 in the medium M in order to search for one or more receivers 20 (badges) in the medium M and to cause them to react in order to identify them.

According to the first variant, the wave shaping device 10 operates independently of the transmitter 30 and/or of the badge identification system.

In this case, after reception of a secondary wave, the wave shaping device 10 can vary the impedance (electromagnetic) of the adaptable surface 11. For example, this adaptation/optimization (as explained above) can be done at the second reception or after, and for each new reception or at a predefined periodicity.

As for the badge identification system, it also receives the secondary wave via an antenna (for example the antenna array 32 of the transmitter 30) and performs the reading or the decoding of the numerical identification code included in the secondary wave signal.

According to a second variant, the wave shaping device 10 is connected to or forms part of the badge identification system. It is therefore not independent of it.

In this case, the badge identification system may possibly wait until the optimization of the wave shaping device 10 is finalized before reading or decoding the numerical identification code included in the secondary wave signal.

Optionally, the antenna array 32 and the receiving device 14 are one and the same device for emitting and/or receiving waves.

The wave shaping device 10 therefore improves the reception of the secondary wave of a badge identification system. It also improves the reading or decoding of the numerical identification code of a receiver 20 (badge). This reading or decoding can done more quickly, and the badge identification system is able to read a plurality of badges more quickly in the medium M.

Finally, the wave shaping device 10 or only the adaptable surface 11 may be directly integrated into a building construction element: a concrete block, a brick, insulation, an insulating board, a plasterboard, or other.

The wave shaping device 10 or only the adaptable surface 11 may also be directly integrated into building trim elements: parquet flooring, carpet flooring, tile flooring, paneling, an attached partition, a ceiling, a false ceiling panel, or other.

The wave shaping device 10 or only the adaptable surface 11 may also be directly integrated into furnishing elements: a desk, a cabinet, a unit with shelving, shelves, a mirror, a decorative picture, a light fixture.

This element comprises at least the adaptable surface 11 of the reflecting device or the entire wave shaping device 10. It may be powered from the exterior, or may comprise a battery, or may be powered remotely by induction in a possibly continual manner.

Finally, according to the various embodiments, the wave receiver 20 comprises:
an antenna 22 adapted to receive a primary wave from a transmitter 30, and
a processing unit 21 connected to said antenna in order to process the signals coming from the antenna 22.

The receiver 20 is then advantageously adapted for use with the wave shaping device 10.

According to a first variant, the antenna 22 is connected to a signature element adapted to cause said receiver to emit a secondary wave that is a function of the primary wave received by said antenna.

In particular, the wave shaping device 10 knows the specific and unique characteristics of this signature element so that its recognition process identifies the receiver 20 corresponding to the secondary wave that it receives.

For example, the signature element is a passive element, which consumes little or no energy.

For example, the signature element is a non-linear element that deforms the signal of the primary wave with a predetermined signature in order to generate the signal of the secondary wave.

For example, the signature element is a non-linear electrical circuit that deforms the signal of the primary wave with a predetermined signature in order to generate the signal of the secondary wave.

As already explained in the above description of the estimation module 12c, and in a reciprocal and similar manner, the primary wave has a main signature, and the predetermined signature is at least one signature frequency different from said main frequency.

The signature frequency is possibly an integer harmonic higher or lower than the main frequency.

According to a second variant, a signature element is fixed on the receiver 20, without having any link other than this mechanical link. The signature element emits a secondary wave in relation with the primary wave which it receives at the same time as the antenna 22 of the receiver.

The secondary wave of the signature element is received by the wave shaping device 10 which knows its particular characteristics.

Advantageously, the signature element has a common operating frequency with the antenna 22 of the receiver 20, in other words with the primary wave 40.

In the two above variants, the signature element is for example an identification badge, for example using RFID or any other identification badge technology.

The signature element thus provides the receiver 20 with particular characteristics so that the wave shaping device 10 adapts to this signature element, which has the effect of also adapting or optimizing the reception of the primary wave for the antenna 22 of the receiver 20.

For example, the signature element may be an RFID element attached to a receiver 20 with a Bluetooth type antenna 22, the RFID element and the antenna 22 having at least one frequency in common. The wave shaping device 10 optimizes the reception of the signature element (RFID), which thus also improves the reception of the Bluetooth primary wave by the antenna 22 of the receiver.

The invention claimed is:

1. A wave shaping device, comprising:
a surface which interacts with a primary wave emitted from a transmitter, said surface comprising a plurality of adjustable elements for modifying an impedance of said surface and for modifying a manner by which the primary wave is reflected and/or transmitted by said surface;

a controller connected to the surface, said controller comprising an optimization module which maximizes or minimizes a value for determining parameters, said controller configured to control the adjustable elements based on said parameters; and a wave receiving device which is connected to the controller and which measures a secondary wave generated by reception of the primary wave by a receiver, without the receiver transmitting information to the wave shaping device concerning reception of the primary wave by the receiver, wherein the controller comprises an estimation module which determines an estimated value for the reception of the primary wave by the receiver, by means of the measurement of the secondary wave, and wherein the optimization module of the controller uses said estimated value to determine the control parameters of the adjustable elements.

2. The device according to claim 1, further comprising:
a transmission device connected to the controller and connected to the transmitter of the primary wave by a network link in order to know a time instant at which the transmitter emits the primary wave, wherein the estimation module uses said time instant to determine the estimated value for said receiver.

3. The device according to claim 1, wherein the estimation module performs a recognition of the receiver by comparing a processing of the measurement of the secondary wave with a predetermined signature corresponding to said receiver, and then deduces the estimated value.

4. The device according to claim 3, wherein the comparison is a calculation of a correlation or inter-correlation between the processing of the measurement of the secondary wave and the predetermined signature.

5. The device according to claim 3, wherein the processing comprises an extraction of a time signal.

6. The device according to claim 3,
wherein the primary wave has a main frequency, and
wherein the processing comprises an extraction of at least one signature frequency different from said main frequency.

7. The device according to claim 6, wherein the signature frequency is an integer harmonic higher or lower than the main frequency.

8. The device according to claim 3, wherein the processing comprises a heterodyne detection which lowers frequencies of the measurement of the secondary wave.

9. The device according to claim 3, wherein the processing comprises a decoding of a numeric code included in the measurement of the secondary wave.

10. The device according to claim 1, wherein the wave receiving device comprises a multi-antenna for spatially selecting a region including the receiver.

11. The device according to claim 1, wherein the wave receiving device focuses on the receiver by beamforming.

12. The device according to claim 1, wherein:
the receiver is a module for recovering energy from the primary wave, and
the estimated value corresponds to an estimate of an intensity of the primary wave received by the receiver.

13. The device according to claim 1, wherein:
the receiver is a wireless communication device (20), and
the transmitter is an access point of a wireless communication network, which emits the primary wave corresponding to a communication with the wireless communication device.

14. The device according to claim 13, wherein the estimation module spies on the communication by measuring the primary wave and extracts data to determine the estimated value.

15. The device according to claim 14, wherein the measuring of the primary wave for spying on the communication is performed by the wave receiving device which measures the secondary wave.

16. The device according to claim 13, further comprising:
a transmission device connected to the controller and connected to the transmitter of the primary wave by a network link in order to know a time instant at which the transmitter emits the primary wave, wherein the estimation module uses said time instant to determine the estimated value for said receiver, and wherein the time instant is the time at which the access point establishes said communication with the wireless communication device.

17. The device according to claim 13, further comprising:
a transmission device connected to the controller and connected to the transmitter of the primary wave by a network link in order to know a time instant at which the transmitter emits the primary wave, wherein the estimation module uses said time instant to determine the estimated value for said receiver, and wherein the estimation module receives, from the access point and via the network link connected to the transmission device, the communication between said access point and the receiver, and extracts data therefrom to determine the estimated value.

18. A wave receiver adapted for use with the wave shaping device according to claim 1, said wave receiver comprising:
an antenna adapted to receive the primary wave from the transmitter;
a processing unit connected to said antenna and configured to process the signals from the antenna; and
a signature element adapted to emit the secondary wave which is a function of the primary wave.

19. The receiver according to claim 18, wherein the signature element is connected to the antenna in order to cause the antenna 4 to emit the secondary wave.

20. The receiver according to claim 18, wherein the signature element is a passive element.

21. The receiver according to claim 18, wherein the signature element is a non-linear electrical circuit which deforms the signal of the primary wave with a predetermined signature in order to generate the secondary wave signal.

22. The receiver according to claim 21,
wherein the primary wave has a main frequency, and
wherein the predetermined signature is at least one signature frequency different from said main frequency.

23. The receiver according to claim 22, wherein the signature frequency is an integer harmonic higher or lower than the main frequency.

* * * * *